No. 722,663.　　　　　　　　　　　　　PATENTED MAR. 17, 1903.
C. H. BAKER.
SOCKET FOR TELEGRAPH POLES.
APPLICATION FILED OCT. 6, 1902.
NO MODEL.
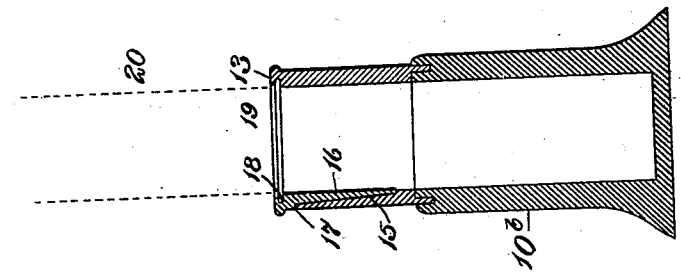
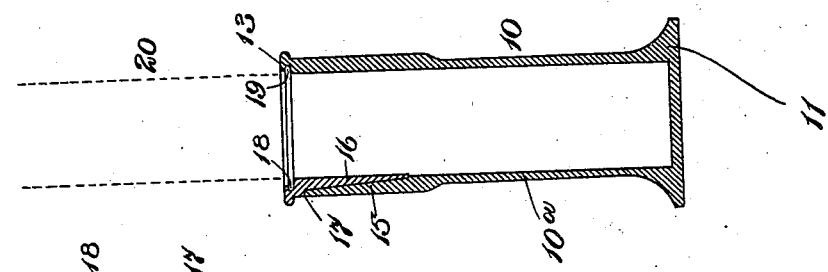
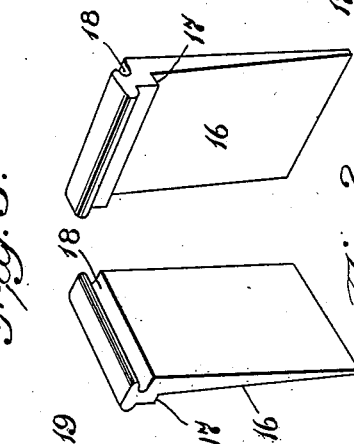
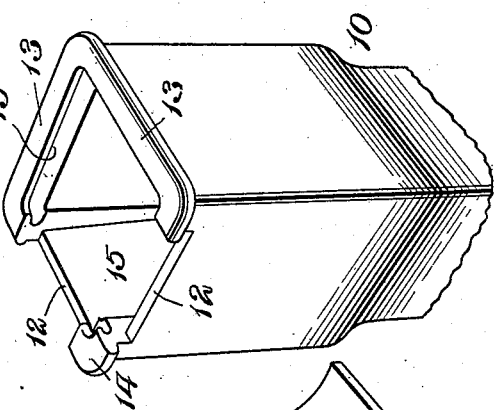
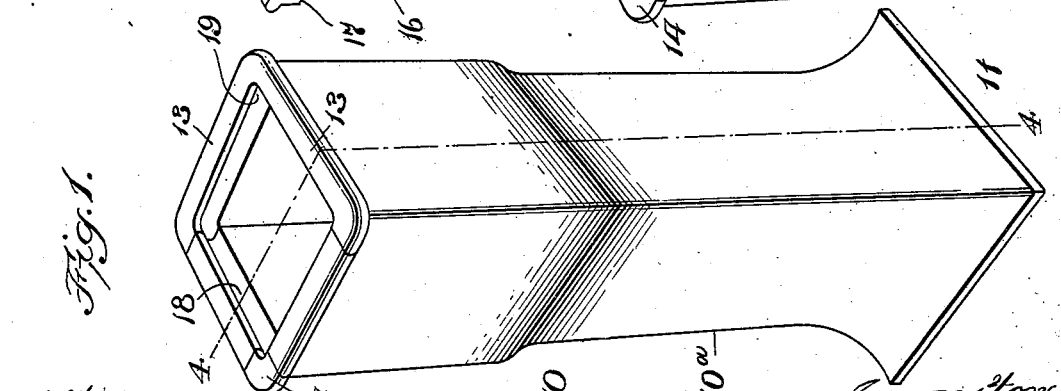

UNITED STATES PATENT OFFICE.

CHARLES H. BAKER, OF LYNN, MASSACHUSETTS.

SOCKET FOR TELEGRAPH-POLES.

SPECIFICATION forming part of Letters Patent No. 722,663, dated March 17, 1903.

Application filed October 6, 1902. Serial No. 126,032. (No model.)

*To all whom it may concern:*

Be it known that I, CHARLES H. BAKER, of Lynn, in the county of Essex and State of Massachusetts, have invented certain new and useful Improvements in Sockets for Telegraph-Poles, of which the following is a specification.

This invention relates to socket-holders for location in the ground and adapted to removably receive the bases or lower ends of telegraph and other poles or posts.

The object of the invention is the production of a device of this character which will enable a pole or post to be readily inserted in the socket, although shaped to have a close fit therein.

Another object of the invention is to provide certain improvements relating to means for preventing access of water to the socket after the pole or post has been inserted therein.

To these ends the invention consists in the construction and arrangement substantially as hereinafter described and claimed.

Of the accompanying drawings, forming a part of this specification, Figure 1 represents a perspective view of the upper end of a socket constructed in accordance with this invention. Fig. 2 represents a similar view, but with the wedge-plates removed. Fig. 3 represents the two wedge-plates which have been removed from Fig. 2. Fig. 4 represents a section of the entire socket on the line 4 4 of Fig. 1. Fig. 5 represents a view similar to Fig. 4, but representing a modification hereinafter referred to.

Similar reference characters indicate similar parts throughout the several views.

Referring first to Figs. 1 to 4, inclusive, the socket is composed of a casting 10, preferably rectangular in cross-section and having an enlarged base or foot flange 11, which will prevent the socket from being withdrawn from the ground after having been once set therein.

The upper end of the socket is cut away on two sides to form two plain upper edges 12, the remaining edges 13 being provided with internal grooves running lengthwise thereof. Between the two cut-away portions, which leave the edges 12, a projection 14 is formed at one corner of the upper end of the socket, which projection is formed with an internal groove or recess similar to the grooves in the projecting edges 13.

Two of the inner walls or sides of the socket-cavity below the plain edges 12 are beveled to present inclined inner faces 15, with which inclined faces wedge-plates 16 are adapted to coact in holding a pole or post firmly in the socket. The wedge-plates 16 are formed with external shoulders 17, adapted to rest upon the plain upper edges 12 of the socket, and with grooves 18, extending longitudinal of the upper ends thereof, so that when said wedge-plates are in the position indicated in Figs. 1 and 4 the grooves 18 will be opposite the grooves 19 in the inner faces of the edges 13. Each wedge-plate is formed so that when its outer face bears against an inclined side 15 its inner face will be vertical, and therefore will have an extended bearing on the corresponding vertical side of the pole. The said bearing is adjustable by a vertical movement of the wedge-plate to compensate for shrinkage of the pole.

The grooves 18 and 19 are for the purpose of receiving suitable packing, which will prevent the entrance of water around the inserted pole or post.

It will be seen that with a socket constructed as above described a pole or post (indicated by the dotted lines 20) may be made to fit the socket tightly and still may be readily inserted therein owing to the tapering mouth of the socket caused by the inclined inner faces 15, and when said pole or post has been inserted in the socket to its full extent the wedge-plates 16 may be slipped into place, as clearly shown in Figs. 1 and 4, so as to bind the pole firmly in the socket. By referring to Fig. 4 it will be seen that each wedge-plate is formed of such a thickness that when it is inserted to a position where its shoulder 17 will bear upon the edge 12 the inner face of the wedge-plate will project beyond the inner wall of the casting below it. Therefore by driving these wedge-plates down they can be made to firmly bind the pole. When packing is inserted in the grooves 18 and 19, there is no possibility of water gaining access to the inside of the socket and resulting in the rotting of the pole.

Preferably the lower portion of the casting will be made thinner, as indicated at 10ª in Fig. 4, and it will be readily understood that the walls of the socket which are not internally beveled need be no thicker than the portion of the socket shown at 10ª. It is essential, however, that the portions of the socket which are beveled shall be thick enough to stand the strain of the wedge-plates, and therefore when the wedge-plates are in place the total thickness of the socket at this point must necessarily be greater than will be necessary at other points.

As indicated in Fig. 5, the lower portion of the socket may be of cement, as indicated at 10ᵇ.

I claim—

1. A pole-socket having a pole-receiving cavity which is rectangular in cross-section and has inclined sides, and independent wedge-plates formed to be inserted between said inclined sides and the adjacent vertical sides of a pole inserted in the socket, the inner faces of the wedge-plates being parallel with the sides of the pole when its outer faces bear against the inclined sides of the socket, whereby the wedges are caused to furnish extended bearings which are adjustable to compensate for shrinkage of the pole.

2. A pole-socket having two of its walls at the upper end thereof internally beveled and of lesser height than the other two walls, in combination with wedge-plates adapted to fit the said beveled faces and having shoulders to rest upon the top edges.

3. A pole-socket having two of its walls at the upper end thereof internally beveled and of lesser height than the other two walls, in combination with wedge-plates adapted to fit the said beveled faces and having shoulders to rest upon the top edges, the upper edges of the wedge-plates and the walls of the socket opposite thereto being horizontally grooved to receive packing.

4. A pole-socket having two of its walls at the upper end thereof internally beveled, in combination with wedge-plates adapted to fit the said beveled faces, the upper edges of the wedge-plates and the walls of the socket opposite thereto being horizontally grooved to receive packing.

In testimony whereof I have affixed my signature in presence of two witnesses.

CHARLES H. BAKER.

Witnesses:
FRANK T. MOORE,
MILLIE A. TIRRELL.